United States Patent
Li

(10) Patent No.: US 8,464,051 B2
(45) Date of Patent: Jun. 11, 2013

(54) METHOD, APPARATUS, TERMINAL AND SYSTEM FOR CHANNEL ENCRYPTION

(75) Inventor: Qiuzhu Li, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/579,954

(22) PCT Filed: Sep. 20, 2010

(86) PCT No.: PCT/CN2010/077137
§ 371 (c)(1),
(2), (4) Date: Aug. 20, 2012

(87) PCT Pub. No.: WO2011/157004
PCT Pub. Date: Dec. 22, 2011

(65) Prior Publication Data

US 2012/0317415 A1 Dec. 13, 2012

(30) Foreign Application Priority Data

Jun. 18, 2010 (CN) .......................... 2010 1 0202861

(51) Int. Cl.
*H04L 29/06* (2006.01)
(52) U.S. Cl.
USPC ........... 713/165; 713/166; 713/167; 713/168; 726/27; 726/28; 726/29; 726/30
(58) Field of Classification Search
USPC ........................................................ 713/165
See application file for complete search history.

(56) References Cited

U.S. PATENT DOCUMENTS

| 7,853,655 | B2 | 12/2010 | Nussey | |
|---|---|---|---|---|
| 8,347,088 | B2 * | 1/2013 | Moore et al. | 713/166 |
| 2004/0168064 | A1 * | 8/2004 | Shimizu et al. | 713/176 |
| 2007/0094346 | A1 * | 4/2007 | Nussey | 709/217 |

FOREIGN PATENT DOCUMENTS

CN 101346712 A 1/2009

OTHER PUBLICATIONS

International Search Report in international application No. PCT/CN2010/077137, mailed on Mar. 24, 2011.
English Translation of the Written Opinion of the International Search Authority in international application No. PCT/CN2010/077137, mailed on Mar. 24, 2011.
A missing piece of RSS technology Dec. 31, 2009.

* cited by examiner

*Primary Examiner* — Longbit Chai
(74) *Attorney, Agent, or Firm* — Oppedahl Patent Law Firm LLC

(57) ABSTRACT

The disclosure discloses a method, an apparatus, a terminal and a system for channel encryption. The method includes that: a relay server receives a channel encryption request from a client, and acquires encrypted information, client information and a locally stored channel Extensible Markup Language (XML) file of the client from the channel encryption request (S101); and according to the encrypted information, the client information and the locally stored channel XML file of the client, the relay server acquires an encrypted channel XML file and stores the encrypted channel XML file, and sends the encrypted channel XML file to the client to enable the client to update the locally stored channel XML file according to the encrypted channel XML file (S102). By means of the technical solution of the disclosure, the privacy of a user is protected, and the security of Really Simple Syndication (RSS) channel management is enhanced.

19 Claims, 5 Drawing Sheets

— step 101
a relay server receives a channel encryption request from a client, and acquires encrypted information, client information and a locally stored channel Extensible Markup Language (XML) file of the client from the channel encryption request — step 102
according to the encrypted information, the client information and the locally stored channel XML file of the client, the relay server acquires an encrypted channel XML file and stores the encrypted channel XML file, and sends the encrypted channel XML file to the client to enable the client to update the locally stored channel XML file according to the encrypted channel XML file

METHOD, APPARATUS, TERMINAL AND SYSTEM FOR CHANNEL ENCRYPTION

TECHNICAL FIELD

The disclosure relates to the field of communication technology, in particular to a method, an apparatus, a terminal and a system for channel encryption.

BACKGROUND

At present, with the communication and sharing of information becoming more and more important, a network user expects to obtain information concerned by the network user more conveniently and quickly; a website serving as an information source wishes that it can be more convenient for a client (user agent) to directly access content; a website receiving information expects to receive various information more conveniently and perform real-time tracking so as to achieve the purpose of extensiveness and timeliness. Therefore, a Really Simple Syndication (RSS), as a new information communication standard, provides an automatic information communication method between any two sites of the Internet; the RSS is a web content syndication format, which can simultaneously search and organize customized news and directly transmit the news to a terminal according to a preset format, location, time and method, so as to enable a user of the information to have absolute choice of the information and selectively obtain the information needed by the user.

As the information communication standard, the RSS has the following two features: one is that information communication between websites is automatically completed without needing human intervention; and the other is that transmitted content is classified index information. The above two features indicate that the RSS has implication of semantics which enables the definition of Internet information to rise from a level of pure text symbol to a level of semantic relation and exerts an influence to the speed and breadth of Internet information transmission.

The RSS is a text-based format, which is formed by means of an Extensible Markup Language (XML) technology and thus finishes the automatic transmission of information between internet sites. An XML is a cross-platform technology relying on content in the Internet environment and is a powerful tool for processing information of a structured document at present. The XML is a simple data storage language, which describes data by using a series of simple marks, wherein the marks can be established by a convenient way; although the XML occupies more space than binary data, the XML is extremely simple and is easy to learn and use. In an actual application, a RSS file is marked as the XML, a RSS channel generally only contains a simple item list, and generally each item contains a title, a simple introduction, a Uniform Resource Locator (URL) link (for example, a web site), and other information such as date, a creator's name, all of which are optional.

Although the RSS brings great convenience for a user to browse and acquire information, privacy protection becomes more important along with the expansion of mode of information communication and broadcasting. A user further expects that his own RSS channel can only be browsed and updated by the user per se like personal information. However, at present, there is not any technical solution for performing encryption management on the RSS channel in the prior art, so that the privacy of a user can not be protected well.

SUMMARY

The disclosure provides a method, an apparatus, a terminal and a system for channel encryption, so as to solve the problem in the prior art that encryption management can not be performed on a RSS channel so that the privacy of a user can not be protected well.

The disclosure provides a method for channel encryption, which includes that:

a relay server receives a channel encryption request from a client, and acquires encrypted information, client information and a locally stored channel Extensible Markup Language (XML) file of the client from the channel encryption request; and according to the encrypted information, the client information and the locally stored channel XML file of the client, the relay server acquires an encrypted channel XML file and stores the encrypted channel XML file, and sends the encrypted channel XML file to the client to enable the client to update the locally stored channel XML file according to the encrypted channel XML file.

The disclosure further provides an apparatus for channel encryption, which includes:

an acquisition module configured to receive a channel encryption request sent from a client, and acquire encrypted information, client information and a locally stored channel XML file of the client from the channel encryption request; and a processing module configured to, according to the encrypted information, the client information and the channel XML file, acquire an encrypted channel XML file and store the encrypted channel XML file, and send the encrypted channel XML file to the client, and updating the locally stored channel XML file by the client according to the encrypted channel XML file.

The disclosure further provides a terminal for channel encryption, which includes:

a sending module configured to send a channel encryption request to a relay server, wherein the channel encryption request includes encrypted information, client information and a locally stored channel XML file of the client; and an updating module configured to receive an encrypted channel XML file from the relay server and update the locally stored channel XML file according to the encrypted channel XML file.

The disclosure further provides a system for channel encryption, which includes the apparatus for channel encryption and the terminal for channel encryption above.

The disclosure has the following beneficial effects:

by means of encrypting a channel through a relay server, one embodiment of the disclosure solves the problem in the prior art that encryption management can not be performed on a RSS channel so that the privacy of a user can not be protected well; by means of the technical solution of the disclosure, the RSS channel is kept in an encrypted state when being browsed and updated; therefore, it can be avoided that the RSS channel is randomly browsed and updated in the condition that the user does not know, so that the privacy of the user is protected and the security of RSS channel management is enhanced.

DETAILED DESCRIPTION

In order to solve the problem in the prior art that a RSS channel can not be performed encipherment management so that the privacy of a user can not be protected well, the disclosure provides a RSS-based method for encrypting channel browsing and channel updating and a method for controlling security of a RSS content subscription; the disclosure will be further illustrated in detail in conjunction with the accompanying drawings and embodiments hereinafter. It should be understood that, the specific embodiments described here are only intended to illustrate the disclosure but to limit the disclosure.

Method Embodiment

Figure 1:
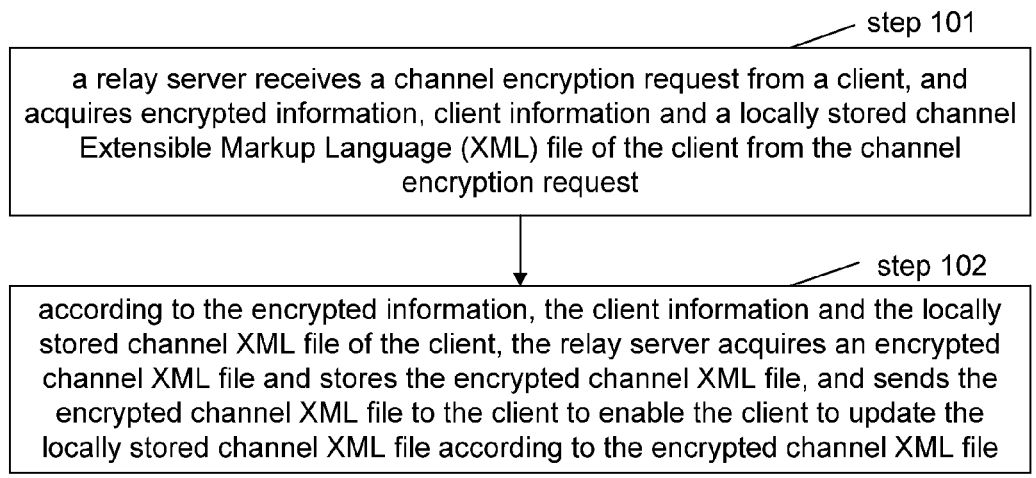
FIG. 1 shows a flowchart of a method for channel encryption according to one embodiment of the disclosure.

According to the embodiment of the disclosure, a method for channel encryption is provided. FIG. 1 shows a flowchart of a method for channel encryption according to one embodiment of the disclosure; as shown in FIG. 1, the method for the channel encryption according to the embodiment of the disclosure includes the following processing:

step 101: a relay server receives a channel encryption request from a client, and acquires encrypted information, client information and a locally stored channel XML file of the client from the channel encryption request;

in addition, before receiving the channel encryption request from the client, the client needs to subscribe a channel, and after subscribing the channel, the client receives a channel XML file from a channel server and stores the channel XML file; subsequently, the client sets a channel plaintext password for the channel and stores the channel plaintext password, and encrypts the channel plaintext password by using an encryption algorithm to obtain the encrypted information;

it should be noted that, the channel above is a RSS channel and the client information above is an address of the client; and step 102: according to the encrypted information, the client information and the locally stored channel XML file of the client, the relay server acquires an encrypted channel XML file and stores the encrypted channel XML file, and sends the encrypted channel XML file to the client to enable the client to update the locally stored channel XML file according to the encrypted channel XML file. Through the step 102, information that the user requests to be encrypted is added to the subscribed channel so that the user has to input a correct password to proceed when clicking to browse the channel or update the channel.

In the step 102, the relay server specifically performs the following processing: first, the relay server adds an encrypted information tag and a client information tag in the channel XML file, and subsequently stores the encrypted information into the encrypted information tag and stores the client information into the client information tag to obtain the encrypted channel XML file.

In addition, according to the embodiment of the disclosure, under the circumstances that the client modifies the password of the channel, the relay server first needs to acquire new encrypted information sent from the client and the client information; subsequently, the relay server stores the new encrypted information into the encrypted information tag according to the client information and deletes the original encrypted information to acquire a new encrypted channel XML file; and finally, the relay server sends the new encrypted channel XML file to the client to enable the client to update the locally stored channel XML file according to the new encrypted channel XML file.

Under the circumstances that the client updates the encrypted channel, after the client successfully verifies a password input by a user, the relay server receives a channel update request from the client and acquires the client information included in the channel update request; subsequently, the relay server determines according to the client information that the encrypted information tag is added to a locally stored corresponding channel XML file and acquires the encrypted information in the encrypted information tag, and sends a channel update request to the channel server, receives a new channel XML file from the channel server and deletes an original channel XML file; next, the relay server adds the encrypted information tag and the client information tag in the new channel XML file, stores the acquired encrypted information into the encrypted information tag and stores the acquired client information into the client information tag to obtain an updated encrypted channel XML file; and finally, the relay server sends the updated encrypted channel XML file to the client to enable the client to perform update according to the updated encrypted channel XML file.

To sum up, in the embodiment of the disclosure, the user can select an RSS channel to subscribe and the RSS server (i.e., the channel server above) transmits the content to the client. After the subscription is successful, the client sends an encryption request to report the encrypted information, client (User Agent, UA for short) information and a locally stored original channel XML file to the relay server. After receiving the content above, the relay server adds the encrypted information and the UA information to the XML file and stores the XML file into the relay server, and then synchronously transmits the XML file to the client; the client updates a local channel XML file. When a user selects to browse or update the channel, the user is required to input a correct password for verification and then can browse or update the channel. During the updating process, ciphertext and UA information are first sent to the relay server, then the relay server downloads a new channel file from the RSS server, and finally the ciphertext and UA tag are also added to the new channel file and the new channel file is transmitted to the client. Unencrypted channel information is not managed through the relay server.

Through the processing above, the RSS channel is kept in an encrypted state when being browsed and updated; therefore, it can be avoided that the channel is randomly browsed and updated in the condition that the user does not know, so that the privacy of the user is protected and the security of RSS channel management is enhanced.

Operations of channel encryption, channel password modification, channel update in the embodiments of the disclosure will be in detail illustrated respectively hereinafter.

1. Channel Encryption

Figure 2:
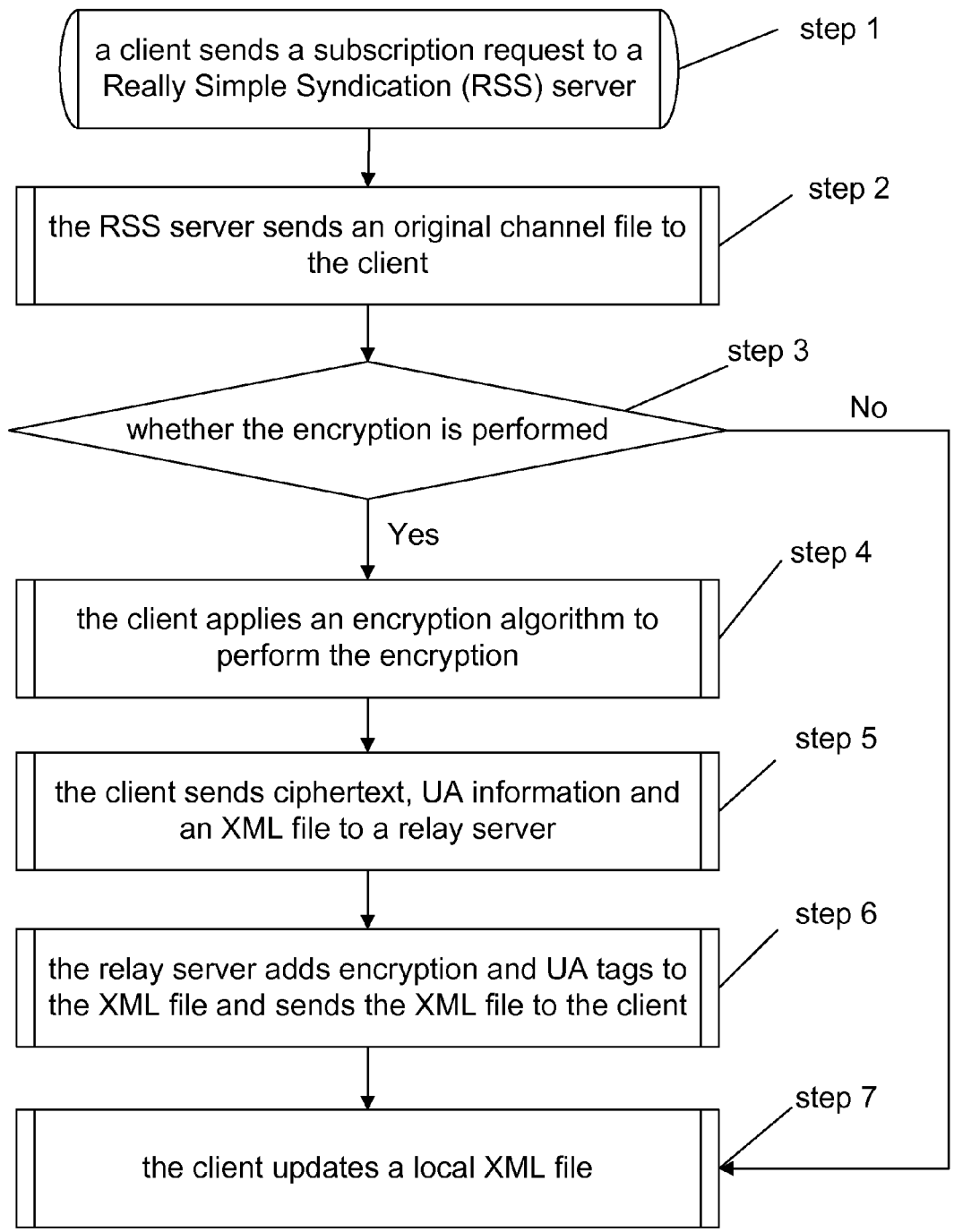
FIG. 2 shows a flowchart of detailed processing of performing channel encryption according to the embodiment of the disclosure.

FIG. 2 shows a flowchart of detailed processing of performing channel encryption according to one embodiment of the disclosure; as shown in FIG. 2, the flow includes the following processing:

step 1: a user selects an RSS channel and inputs a URL address thereof to subscribe;

step 2: an RSS server receives an HTTP request head of a client and sends an XML file corresponding to channel content to the client;

step 3: the client stores the received content and the user judges whether the content is encrypted, if yes, the step 4 is executed; otherwise, the step 7 is executed;

step 4: the client inputs a password and stores the password locally, and encrypts a plaintext by using an encryption algorithm to obtain a ciphertext;

step 5: the client sends an encryption request, the ciphertext and an address of a client (UA), together with an XML original file, to a relay server;

step 6: according to the message, the relay server adds a corresponding tag in an original channel XML text, wherein the tag includes: a tag representing encryption, wherein the tag stores the ciphertext; and a tag representing a client address, wherein the tag is used for storing UA information; in the embodiment of the disclosure, the added tag can be referred to the definition in Table 1, and an encrypted channel XML file can be obtained and the encrypted XML file is sent to the client;

TABLE 1

| Tag Name | Xml Syntax |
|---|---|
| Client UA | <user-agent>......</user-agent> |
| Ciphertext | <encrypt>......</encrypt> | the entire framework structure of the obtained encrypted channel XML file is as follows:

```
<?xml version="1.0" encoding="UTF-8"?>
<?xml-stylesheet type='text/css' href='....'?>
<user-agent>.... </user-agent>
<encrypt>...</encrypt>
<rss version="2.0">
    <channel path="..." updatenum="...">
        <title>... </title>
        <image>
        </image>
        <description>...</description>
        <link>...</link>
        <language>...</language>
        <docs>...</docs>
        <generator>...</generator>
        <ttl>...</ttl>
        <item readed="1">
        </item>
    </channel>
</rss>
``` and step 7: the client updates the local XML file.

2. Channel Password Modification

Figure 3:
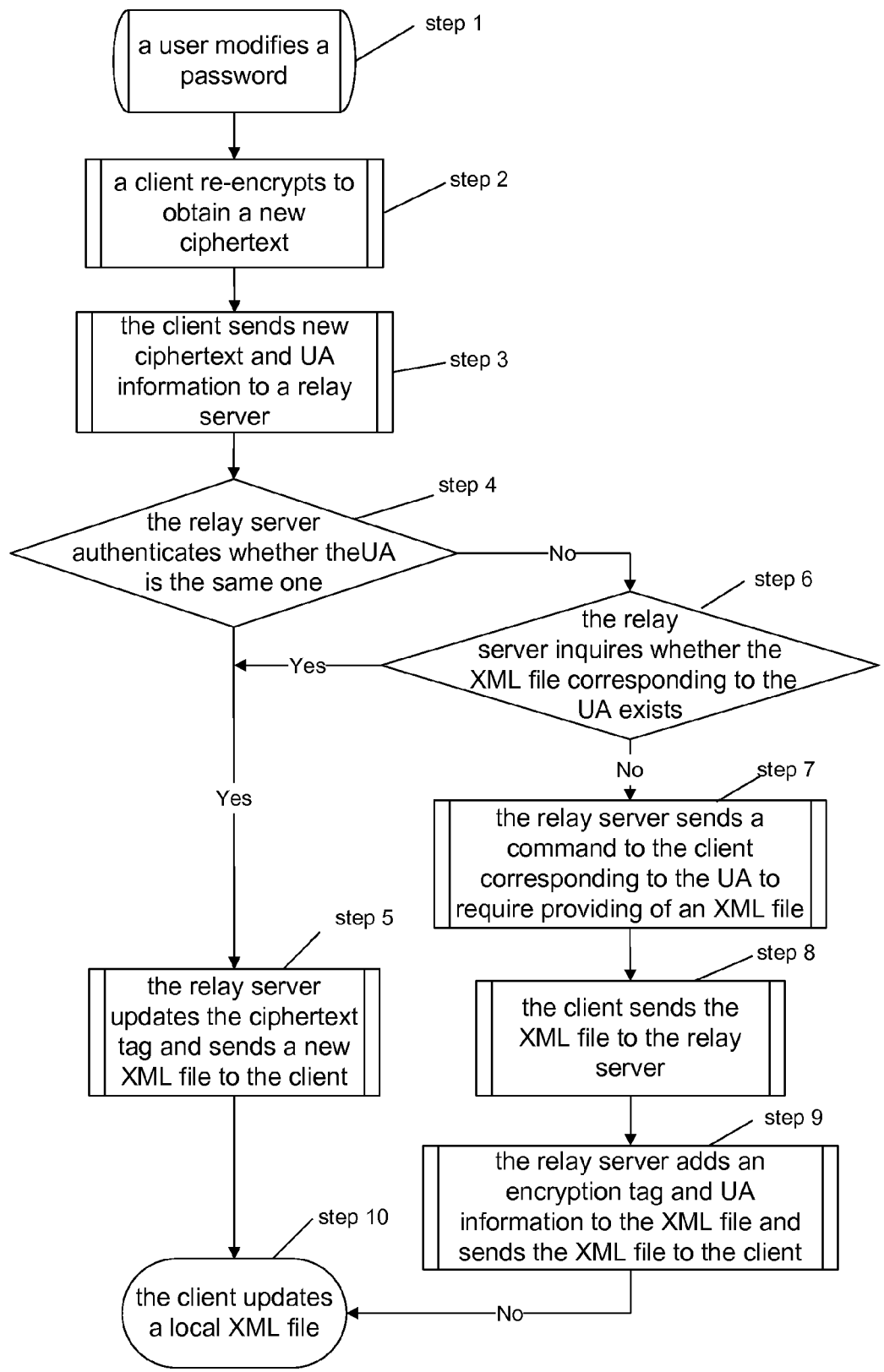
FIG. 3 shows a flowchart of detailed processing of modifying a channel password according to the embodiment of the disclosure.

FIG. 3 shows a flowchart of detailed processing of modifying a channel password according to one embodiment of the disclosure; as shown in FIG. 3, the flow includes the following processing:

step 1: a user modifies a password;

step 2: a client encrypts a modified plaintext by using an encryption algorithm to obtain a new ciphertext;

step 3: the client resends the new ciphertext and UA information to a relay server;

step 4: the relay server judges whether the UA is the same UA according to the UA information from the client, if yes, the step 5 is executed; otherwise, the step 6 is executed;

step 5: the relay server modifies an original ciphertext tag to be a new ciphertext, stores the new ciphertext and then resends the new ciphertext to the client; and then step 10 is executed;

step 6: whether the XML file corresponding to the UA exists is inquired, if yes, the step 5 is executed; otherwise, the step 7 is executed;

step 7: a command is sent to the client corresponding to the UA to request to provide an XML file;

step 8: the client sends the XML file to the relay server;

step 9: the relay server adds an encryption tag and UA information in the XML file and sends the XML file to the client; and the step 10 is executed;

step 10: the client updates the local channel file.

3. Channel Update

Figure 4:
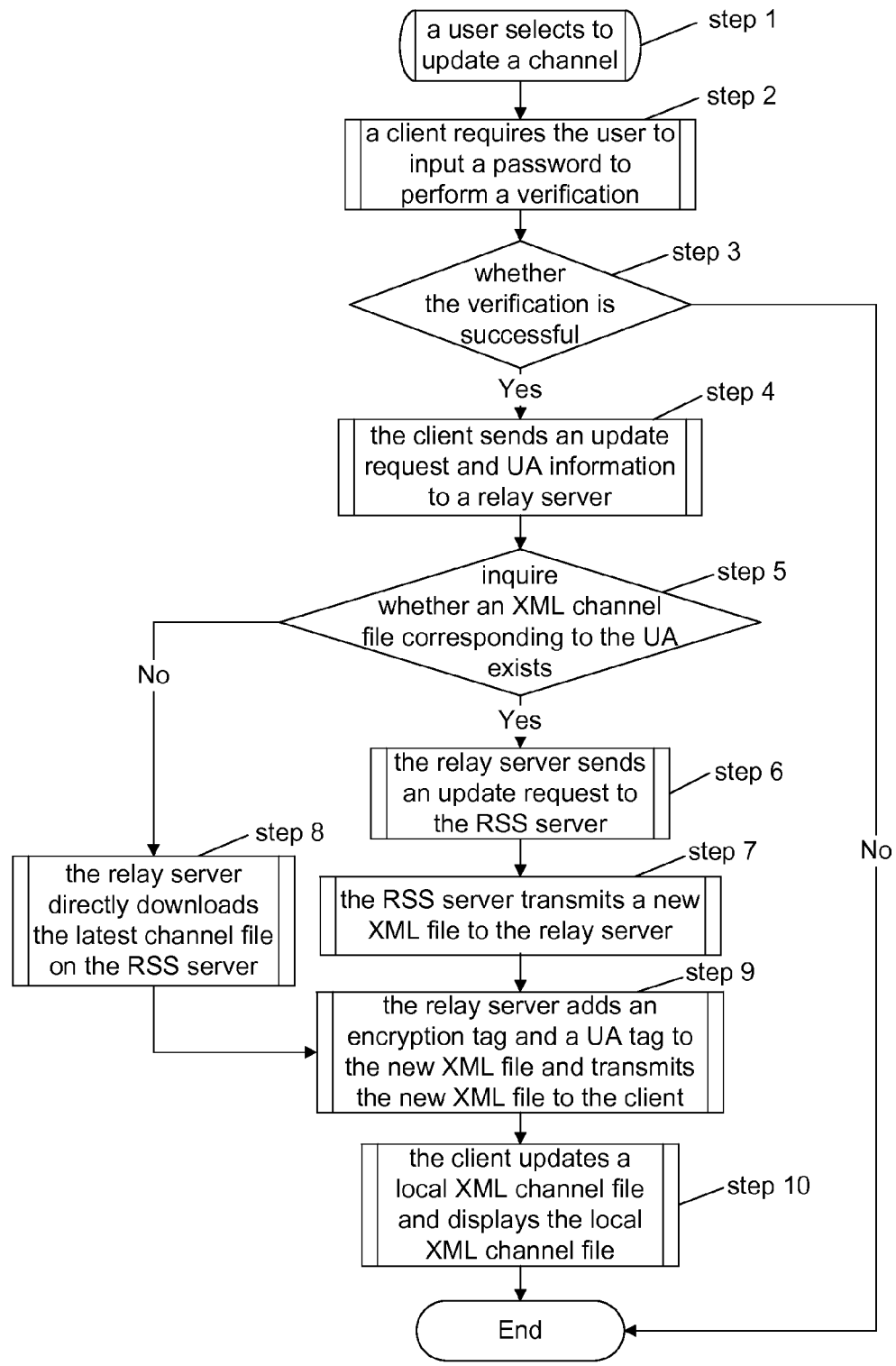
FIG. 4 shows a flowchart of detailed processing of updating a channel according to the embodiment of the disclosure.

FIG. 4 shows a flowchart of detailed processing of updating a channel according to one embodiment of the disclosure; as shown in FIG. 4, the flow includes the following processing:

step 1: a user selects to update an encrypted channel;

step 2: a client requires the user to input a password to verify;

step 3: the client judges whether the verification is successful, if yes, the step 4 is executed; otherwise, the operation is ended;

step 4: the client sends an update request to a relay server after the verification is successful, wherein the request includes UA address information of the client;

step 5: the relay server receives the update request, inquires the UA information and judges whether the XML file corresponding to the UA exists, if yes, the step 6 is executed; otherwise, the step 8 is executed;

step 6: the relay server finds that an encryption tag is added to the corresponding XML file, then reserves an original encryption tag and UA information, and sends an update request to an RSS server;

step 7: the RSS server sends a new XML channel file to the relay server; and the step 9 is executed;

step 8: the relay server directly downloads the latest XML file from the RSS server; and then the step 9 is executed;

step 9: the relay server deletes the original XML file, adds a UA tag and an encryption tag to the new XML channel file and then transmits the new XML channel file to the client; and step 10: after receiving a response message, the client downloads the updated channel XML file and locally displays the updated channel XML file.

It can be seen from the processing above that, encrypted information and a client UA of a channel is uploaded to a relay server in a terminal device and then the relay server, after receiving the request, adds an encryption tag and a UA tag to the original channel XML file to manage a RSS channel of the client, so that the channel is kept in an encrypted state when being browsed and updated and the ciphertext does not disappear after the channel is updated. By means of the technical solution of the embodiment of the disclosure, the privacy of a user is protected and the security of RSS channel management is enhanced.

Hereinafter, combination of the three parts of operations above of the technical solution of the embodiments of the disclosure will be illustrated by taking a RSS news center channel "focus picture news" of a website for example.

Step 1: a client inputs a URL address: "http://rss.news.sohu.com/rss/pfocus.xml" of the news channel to subscribe;

step 2: an RSS server sends the client an XML file corresponding to of channel information;

step 3: after saving the original file locally, the client encrypts the original file to obtain a ciphertext; provided an input password is a character string "sohurss" and an applied encryption algorithm is an aes algorithm, the ciphertext is obtained;

step 4: the client sends ciphertext information and UA information, together with a locally stored channel source file, to a relay server through an HTTP request;

step 5: after obtaining the request, the relay server adds an encryption tag and a UA tag to the original XML file and stores the modified XML file, and then sends the modified XML file to the client;

step 6: the client updates a local RSS channel file and synchronously records the password and ciphertext information;

step 7: the user wants to modify the password and inputs a new password "sohunews" to obtain a new ciphertext, and the client sends the new ciphertext and the UA information to the relay server;

step 8: the relay server modifies the ciphertext tag and sends the modified XML file to the client to update;

step 9: the client updates the locally stored XML file and requires the user to input a password to verify when the user clicks to update the channel;

step 10: after the password is successfully verified, the client sends an update request, including the address corresponding to the UA and the ciphertext, to the relay server;

step 11: the relay server is connected to the RSS server, downloads the latest channel file to update from the RSS server and adds tags corresponding to the UA and the ciphertext to replace the original old RSS channel file; and step 12: the relay server sends the latest RSS channel file to the client to update, and the client saves the latest RSS channel file locally and display the latest RSS channel file.

To sum up, by encrypting a channel through a relay server, the embodiments of the disclosure solve the problem in the prior art that encryption management can not be performed on a RSS channel and thus the privacy of a user can not be protected well. By means of the technical solution of the disclosure, the RSS channel is kept in an encrypted state when being browsed and updated; therefore, it can be avoided that the RSS channel is randomly browsed and updated in the condition that the user does not know, so that the privacy of the user is protected and the security of RSS channel management is enhanced.

Apparatus Embodiment 1

Figure 5:
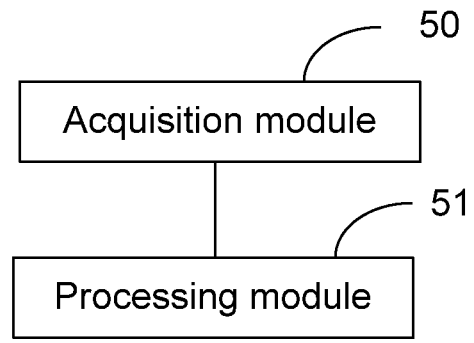
FIG. 5 shows a structure diagram of an apparatus for channel encryption according to one embodiment of the disclosure.

According to the embodiment of the disclosure, an apparatus for channel encryption is provided; FIG. 5 shows a structure diagram of the apparatus for the channel encryption according to the embodiment of the disclosure; as shown in FIG. 5, the apparatus for the channel encryption according to the embodiment of the disclosure includes: an acquisition module 50 and a processing module 51. The apparatus for the channel encryption according to the embodiment of the disclosure will be illustrated in detail hereinafter.

The acquisition module 50 is configured to receive a channel encryption request from a client, and acquire encrypted information, client information and a locally stored channel XML file of the client from the channel encryption request; it should be noted that, the channel above is a RSS channel and the client information above is an address of the client.

The processing module 51 is configured to, according to the encrypted information, the client information and the channel XML file, acquire an encrypted channel XML file and store the encrypted channel XML file, and send the encrypted channel XML file to the client to enable the client to update the locally stored channel XML file according to the encrypted channel XML file. The information that the user requests to encrypt is added to the subscribed channel, so that the user has to input a correct password to proceed when clicking to browse the channel or update the channel.

Preferably, the processing module 51 specifically includes: an addition sub-module configured to add an encrypted information tag and a client information tag to the channel XML file; and a storage sub-module configured to store the encrypted information into the encrypted information tag and store the client information into the client information tag to obtain the encrypted channel XML file.

In addition, according to the embodiment of the disclosure, under the circumstances that the client modifies the password of the channel, the acquisition module is further configured to acquire new encrypted information and the client information sent from the client; the processing module is further configured to store the new encrypted information into the encrypted information tag according to the client information, delete the original encrypted information and acquire a new encrypted channel XML file, and send the new encrypted channel XML file to the client to enable the client to update the locally stored channel XML file according to the new encrypted channel XML file.

Under the circumstances that the client updates the encrypted channel, the acquisition module is further configured to, after the client successfully verifies a password input by a user, receive a channel update request from the client and acquire client information included in the channel update request, determine that the encrypted information tag is added to a locally stored corresponding channel XML file according to the client information and acquire encrypted information in the encrypted information tag; and the processing module is further configured to send the channel update request to the channel server, receive the new channel XML file from the channel server and delete the original channel XML file, add the encrypted information tag and the client information tag to the new channel XML file, store the acquired encrypted information into the encrypted information tag and store the acquired client information into the client information tag to obtain an updated encrypted channel XML file, and send the updated encrypted channel XML file to the client to enable the client to perform update according to the updated encrypted channel XML file.

To sum up, in the embodiment of the disclosure, a user can select a RSS channel to subscribe and the RSS server (i.e., the channel server above) transmits the content to the client. After the subscription is successful, the client sends an encryption request to report the encrypted information, client (User Agent, UA for short) information and a locally stored original channel XML file to the relay server, i.e., the apparatus for the channel encryption above. After receiving the content above, the relay server adds the encrypted information and the UA information to the XML file to store in the relay server and then synchronously transmits to the client; the client updates the local channel XML file. When the user selects to browse or update the channel, the user is required to input a correct password for verification and then can browse or update the channel. During the updating process, ciphertext and UA information are first sent to the relay server, then the relay server downloads a new channel file from the RSS server, and finally the ciphertext and a UA tag are also added to the new channel file and the new channel file is transmitted to the client. Unencrypted channel information is not managed through the relay server.

Through the processing above, the RSS channel is kept in an encrypted state when being browsed and updated; therefore, it can be avoided that the RSS channel is randomly browsed and updated in the condition that the user does not know, so that the privacy of the user is protected and the security of RSS channel management is enhanced.

Apparatus Embodiment 2

Figure 6:
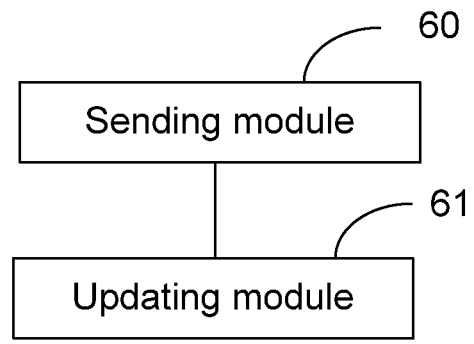
FIG. 6 shows a structure diagram of a terminal for channel encryption according to one embodiment of the disclosure.

According to the embodiment of the disclosure, a terminal for channel encryption is provided; FIG. 6 shows a structure diagram of the terminal for the channel encryption according to the embodiment of the disclosure; as shown in FIG. 6, the apparatus for the channel encryption according to the embodiment of the disclosure includes: a sending module 60 and an updating module 61. The terminal for the channel encryption according to the embodiment of the disclosure will be illustrated in detail hereinafter.

Specifically, the sending module 60 is configured to send a channel encryption request to a relay server, wherein the channel encryption request includes encrypted information, client information and a locally stored channel XML file of the client; and the updating module 61 is configured to receive an encrypted channel XML file from the relay server and update the locally stored channel XML file according to the encrypted channel XML file.

In addition, before the terminal (i.e., the client) for the channel encryption sends a channel encryption request, the client needs to subscribe a channel; after the channel is subscribed, the client receives a channel XML file from a channel server and stores the channel XML file; subsequently, the client sets a channel plaintext password for the channel and stores the channel plaintext password, and encrypts the channel plaintext password by using an encryption algorithm to obtain the encrypted information.

It should be noted that, the channel above is a RSS channel and the client information above is an address of the client.

In addition, according to the embodiment of the disclosure, under the circumstances that the client modifying the password of the channel, the client first needs to send new encrypted information and the client information to the relay server; subsequently, the relay server stores the new encrypted information to the encrypted information tag according to the client information, deletes the original encrypted information and acquires a new encrypted channel XML file; and finally, the relay server sends the new encrypted channel XML file to the client and the client then updates the locally stored channel XML file according to the new encryption channel XML file.

Under the circumstances that the client updating the encrypted channel, after the client successfully verifies a password input by a user, the client sends a channel update request to the relay server, wherein the channel update request includes the client information; subsequently, the relay server determines according to the client information that the encrypted information tag is added to a locally stored corresponding channel XML file and acquires the encrypted information in the encrypted information tag; and sends a channel update request to the channel server, receives a new channel XML file from the channel server and deletes the original channel XML file; next, the relay server adds the encrypted information tag and the client information tag to the new channel XML file, stores the acquired encrypted information into the encrypted information tag and stores the acquired client information into the client information tag to obtain an updated encrypted channel XML file; and finally the relay server sends the updated encrypted channel XML file to the client to perform update according to the updated encrypted channel XML file.

Through the processing above, the RSS channel is kept in an encrypted state when being browsed and updated; therefore, it can be avoided that the channel is randomly browsed and updated in the condition that the user does not know, so that the privacy of the user is protected and security of the RSS channel management is enhanced.

System Embodiment

Figure 7:
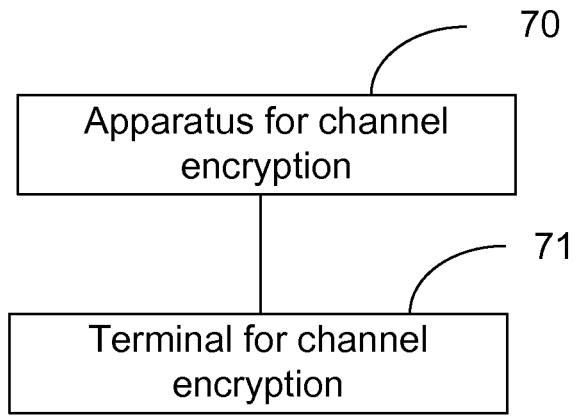
FIG. 7 shows a structure diagram of a system for channel encryption according to one embodiment of the disclosure.

According to the embodiment of the disclosure, a system for channel encryption is provided. FIG. 7 shows a structure diagram of the system for the channel encryption according to the embodiment of the disclosure; as shown in FIG. 7, the apparatus for the channel encryption according to the embodiment of the disclosure includes: an apparatus for channel encryption 70 and a terminal for channel encryption 71.

In the embodiment of the disclosure, a user can select a RSS channel to subscribe and the RSS server (i.e., the channel server above) transmits the content to the terminal for channel encryption 71. After the subscription is successful, the terminal for channel encryption 71 sends an encryption request to report the encrypted information, client (User Agent, UA for short) information and a locally stored original channel XML file to the apparatus for channel encryption 70. After receiving the content above, the apparatus for channel encryption 70 adds the encrypted information and the UA information to the XML file to store in the relay server and then synchronously transmits to the terminal for channel encryption 71; the terminal for channel encryption 71 updates the local channel XML file. When the user selects to browse or update the channel, the user is required to input a correct password for verification and then can browse or update the channel. During the updating process, ciphertext and UA information are first sent to the apparatus for channel encryption 70 and then the apparatus for channel encryption 70 downloads a new channel file from the RSS, also adds the ciphertext and a UA tag to the new channel file, and transmits the new channel file to the terminal for channel encryption 71. Unencrypted channel information is not managed through the apparatus for channel encryption 70.

The apparatus for channel encryption 70 and the terminal for channel encryption 71 have been illustrated in detail in the embodiment above and no further description is needed here; and they can be understood by reference to the description of the embodiment above.

To sum up, by encrypting a channel through a relay server, the embodiment of the disclosure solves the problem in the prior art that a RSS channel can not be performed encryption management and thus the privacy of a user can not be protected well. By means of the technical solution of the disclosure, the RSS channel is kept in an encrypted state when being browsed and updated; therefore, it can be avoided that the RSS channel is randomly browsed and updated in the condition that the user does not know, so that the privacy of the user is protected and the security of RSS channel management is enhanced.

Although the preferable embodiments according to the disclosure have been disclosed for the purpose of example, those skilled in the art should realize that various improvements, increments and replacements can be possible; therefore, the scope of the disclosure should not be limited to the embodiments above.

The invention claimed is:

1. A method for channel encryption, comprising:
   receiving, by a relay server, a channel encryption request from a client, and acquiring encrypted information, client personal information and a locally stored channel Extensible Markup Language (XML) file of the client from the channel encryption request, wherein the channel XML file is provided by a Really Simple Syndication (RSS) channel server upon the client subscription to a RSS channel; and
   according to the encrypted information, the client personal information and the locally stored channel XML file of the client, acquiring, by the relay server, an encrypted channel XML file by adding an encryption tag and a client personal information tag to said channel XML file and storing the encrypted channel XML file, and sending the encrypted channel XML file to the client, and updating the locally stored channel XML file by the client according to the encrypted channel XML file so as to assure said RSS channel can only be browsed and updated by said client.

2. The method for channel encryption according to claim 1, further comprising:
   before receiving a channel encryption request from a client, receiving and storing, by the client, a channel XML file sent from a channel server after the client subscribes the channel; and
   setting, by the client, a channel plaintext password for the channel and storing the channel plaintext password, and encrypting the channel plaintext password by using an encryption algorithm to obtain the encrypted information.

3. The method for channel encryption according to claim 2, wherein the channel is a Really Simple Syndication (RSS) channel; and the client information is an address of the client.

4. The method for channel encryption according to claim 1, wherein the acquiring an encrypted channel XML file by the relay server according to the encrypted information, the client information and the channel XML file comprises:
   adding, by the relay server, an encrypted information tag and a client information tag to the channel XML file; and
   storing, the relay server, the encrypted information into the encrypted information tag and storing the client information into the client information tag to obtain the encrypted channel XML file.

5. The method for channel encryption according to claim 4, further comprising:
   under the circumstances that the client modifies a password of the channel, acquiring, by the relay server, new encrypted information from the client and the client information;
   storing, by the relay server, the new encrypted information into the encrypted information tag according to the client information deleting original encrypted information and acquiring a new encrypted channel XML file; and
   transmitting, by the relay server, the new encrypted channel XML file to the client, and updating the locally stored channel XML file by the client according to the new encrypted channel XML file.

6. The method for channel encryption according to claim 5, wherein the channel is a Really Simple Syndication (RSS) channel; and the client information is an address of the client.

7. The method for channel encryption according to claim 4, further comprising: under the circumstances that the client updates an encrypted channel, receiving, by the relay server, a channel update request from the client and acquiring the client information included in the channel update request after the client successfully verifies a password input by a user;
   determining, by the relay server, that the encrypted information tag is added to a corresponding locally stored channel XML file according to the client information and acquiring the encrypted information in the encrypted information tag;
   sending, by the relay server, the channel update request to the channel server, receiving a new channel XML file from the channel server and deleting an original channel XML file;
   adding, by the relay server, the encrypted information tag and the client information tag to the new channel XML file;
   storing, by the relay server, the encrypted information acquired into the encrypted information tag and storing the client information obtained into the client information tag to obtain an updated encrypted channel XML file; and
   sending, by the relay server, the updated encrypted channel XML file to the client to enable the client to perform update according to the updated encrypted channel XML file.

8. The method for channel encryption according to claim 7, wherein the channel is a Really Simple Syndication (RSS) channel; and the client information is an address of the client.

9. The method for channel encryption according to claim 4, wherein the channel is a Really Simple Syndication (RSS) channel; and the client information is an address of the client.

10. The method for channel encryption according to claim 1, wherein
    the channel is a Really Simple Syndication (RSS) channel; and
    the client information is an address of the client.

11. An apparatus for channel encryption, comprising:
    an acquisition module at a relay server, configured to receive a channel encryption request from a client, and acquire encrypted information, client personal information and a locally stored channel Extensible Markup Language (XML) file of the client from the channel encryption request, wherein the channel XML file is provided by a Really Simple Syndication (RSS) channel server upon the client subscription to a (RSS) channel; and
    a processing module configured to, according to the encrypted information, the client personal information and the channel XML file, acquire by the relay server, an encrypted channel XML file by adding an encryption tag and a client personal information tag to said channel XML file and store the encrypted channel XML file, and send the encrypted channel XML file to the client to enable the client to update the locally stored channel XML file according to the encrypted channel XML file so as to assure said RSS channel can only be browsed and updated by said client.

12. The apparatus according to claim 11, wherein the processing module specifically comprises:
    an addition sub-module configured to add an encrypted information tag and a client information tag to the channel XML file; and
    a storage sub-module configured to store the encrypted information into the encrypted information tag and store the client information into the client information tag to obtain the encrypted channel XML file.

13. The apparatus according to claim 12, wherein
the acquisition module is further configured to, under the circumstances that the client modifies a password of the channel, acquire new encrypted information and the client information sent from the client; and
the processing module is further configured to store the new encrypted information into the encrypted information tag according to the client information, delete original encrypted information and acquire a new encrypted channel XML file, and send the new encrypted channel XML file to the client, wherein the client updates the locally stored channel XML file according to the new encrypted channel XML file.

14. The apparatus according to claim 12, wherein
the acquisition module is further configured to, under the circumstances that the client updates an encrypted channel, after the client successfully verifies a password input by a user, receive a channel update request from the client and acquire the client information included in the channel update request, and determine that the encrypted information tag is added to a corresponding locally stored channel XML file according to the client information and acquire the encrypted information from the encrypted information tag; and
the processing module is further configured to send the channel update request to a channel server, receive a new channel XML file from the channel server, delete an original channel XML file, add the encrypted information tag and the client information tag to the new channel XML file, store the encrypted information acquired into the encrypted information tag and store the client information acquired into the client information tag to obtain an updated encrypted channel XML file, and send the updated encrypted channel XML file to the client to enable the client to perform update according to the updated encrypted channel XML file.

15. A terminal for channel encryption, comprising:
a sending module configured to send, by a terminal device, a channel encryption request to a relay server from a client, wherein the channel encryption request includes encrypted information, client personal information and a locally stored channel Extensible Markup Language (XML) file of the client, wherein the channel XML file is provided by a Really Simple Syndication (RSS) channel server upon the client subscription to a RSS channel; and
an updating module configured to receive an encrypted channel XML file from the relay server and update the locally stored channel XML file according to the encrypted channel XML file to assure said RSS channel can only be browsed and updated by said client, wherein the encrypted channel XML file is acquired by the relay server according to the encrypted information, the client personal information and the channel XML file by adding an encryption tag and a client personal information tag to said channel XML file.

16. A system for channel encryption comprising an apparatus for channel encryption and a terminal for channel encryption, the apparatus for channel encryption comprising:
an acquisition module, at a relay server, configured to receive a channel encryption request from a client, and acquire encrypted information, client personal information and a locally stored channel Extensible Markup Language (XML) file of the client from the channel encryption request, wherein the channel XML file is provided by a Really Simple Syndication (RSS) channel server upon the client subscription to a RSS channel; and
a processing module configured to, according to the encrypted information, the client personal information and the channel XML file, acquire, by the relay server, an encrypted channel XML file by adding an encryption tag and a client personal information tag to said channel XML file and store the encrypted channel XML file, and send the encrypted channel XML file to the client to enable the client to update the locally stored channel XML file according to the encrypted channel XML file so as to assure said RSS channel can only be browsed and updated by said client;
the terminal for channel encryption comprising:
a sending module configured to send, by a terminal device, a channel encryption request to a relay server from a client, wherein the channel encryption request includes encrypted information, client personal information and a locally stored channel XML file of the client, wherein the channel XML file is provided by an RSS channel server upon the client subscription to a RSS channel; and
an updating module configured to receive an encrypted channel XML file from the relay server and update the locally stored channel XML file according to the encrypted channel XML file to assure said RSS channel can only be browsed and updated by said client, wherein the encrypted channel XML file is acquired, by the relay server according to the encrypted information, the client personal information and the channel XML file by adding an encryption tag and a client personal information tag to said channel XML file.

17. The system according to claim 16, wherein the processing module specifically comprises:
an addition sub-module configured to add an encrypted information tag and a client information tag to the channel XML file; and a storage sub-module configured to store the encrypted information into the encrypted information tag and store the client information into the client information tag to obtain the encrypted channel XML file.

18. The system according to claim 17, wherein the acquisition module is further configured to, under the circumstances that the client modifies a password of the channel, acquire new encrypted information and the client information sent from the client; and the processing module is further configured to store the new encrypted information into the encrypted information tag according to the client information, delete original encrypted information and acquire a new encrypted channel XML file, and send the new encrypted channel XML file to the client, wherein the client updates the locally stored channel XML file according to the new encrypted channel XML file.

19. The system according to claim 17, wherein the acquisition module is further configured to, under the circumstances that the client updates an encrypted channel, after the client successfully verifies a password input by a user, receive a channel update request from the client and acquire the client information included in the channel update request, and determine that the encrypted information tag is added to a corresponding locally stored channel XML file according to the client information and acquire the encrypted information from the encrypted information tag; and the processing module is further configured to send the channel update request to a is channel server, receive a new channel XML file from the channel server, delete an original channel XML file, add the encrypted information tag and the client information tag to the new channel XML file, store the encrypted information acquired into the encrypted information tag and store the client information acquired into the client information tag to obtain an updated encrypted channel XML file, and send the updated encrypted channel XML file to the client to enable the client to perform update according to the updated encrypted channel XML file.

\* \* \* \* \*